United States Patent [19]
Watanabe

[11] Patent Number: 5,766,526
[45] Date of Patent: Jun. 16, 1998

[54] METHOD AND APPARATUS FOR INJECTION MOLDING

[75] Inventor: Seiichi Watanabe, Kanagawa, Japan

[73] Assignee: Fuji Photo Film Co., Ltd., Kanagawa, Japan

[21] Appl. No.: 420,816

[22] Filed: Apr. 12, 1995

[30] Foreign Application Priority Data

Apr. 20, 1994 [JP] Japan ................... 6-104398

[51] Int. Cl.$^6$ ................................ B29C 45/77
[52] U.S. Cl. ............... 264/40.5; 264/328.8; 264/328.1; 425/145; 425/146; 425/149
[58] Field of Search ................ 264/40.5, 328.8, 264/DIG. 69, 328.1; 425/144, 146, 147, 165, 166, 145, 149, 156

[56] References Cited

U.S. PATENT DOCUMENTS

| | | | |
|---|---|---|---|
| 3,535,742 | 10/1970 | Marcus | 425/146 |
| 3,771,935 | 11/1973 | Loichen | 425/146 |
| 4,826,641 | 5/1989 | Takeda et al. | 264/40.5 |
| 4,846,651 | 7/1989 | Matsuda et al. | 425/145 |
| 5,030,395 | 7/1991 | Kamiguchi et al. | 264/40.5 |
| 5,062,785 | 11/1991 | Stroud, III et al. | 425/145 |
| 5,164,202 | 11/1992 | Beyer et al. | 425/146 |
| 5,176,859 | 1/1993 | Leffew | 264/40.5 |
| 5,182,716 | 1/1993 | Stroud, III et al. | 264/40.5 X |
| 5,194,195 | 3/1993 | Okushima | 264/40.1 |
| 5,248,460 | 9/1993 | Tsutsumi | 264/40.5 |
| 5,266,247 | 11/1993 | Yokota | 264/40.4 |
| 5,295,800 | 3/1994 | Nelson et al. | 425/130 |
| 5,346,657 | 9/1994 | Hara et al. | 264/40.1 |
| 5,375,991 | 12/1994 | Rydmann et al. | 425/144 |
| 5,419,858 | 5/1995 | Hata et al. | 264/40.5 |
| 5,447,425 | 9/1995 | Hsu et al. | 425/149 |
| 5,500,166 | 3/1996 | Sasaki et al. | 264/40.4 |

FOREIGN PATENT DOCUMENTS

| | | | |
|---|---|---|---|
| 6339951 | 12/1994 | Japan | B29C 45/26 |
| 1420725 | 4/1974 | United Kingdom | B29F 1/06 |
| 1449728 | 6/1974 | United Kingdom | B29F 1/00 |
| 8705559 | 9/1987 | WIPO | B29C 45/77 |

*Primary Examiner*—Harold Y. Pyon
*Attorney, Agent, or Firm*—Sughrue, Mion, Zinn, Macpeak & Seas, PLLC

[57] ABSTRACT

An injection molding method and apparatus in which an injection molding metal mold having a valve gate 7 mechanically opening and closing a gate facing an injection molding cavity is used, and the timing of closing the valve gate is set with reference to a melted resin pressure in the injection molding cavity during a holding pressure step in a molding process. The molding method and apparatus result in high accuracy molded products by utilizing a valve gate system in the injection molding of thin products, and also result in molded products having less variations among cavities even in the case where a plurality of products are molded at the same time.

8 Claims, 4 Drawing Sheets

RELATIONSHIP AMONG PRESSURE HOLDING FORCE, PRESSURE HOLDING TIME, AND WARPING OF MOLDED PRODUCTS

METHOD AND APPARATUS FOR INJECTION MOLDING

BACKGROUND OF THE INVENTION

1. Field of the Invention

The present invention relates to a method and an apparatus for injection molding, and in particular, to a method and an apparatus for injection molding, wherein the shapes of molded products can be stabilized even though the resulting products are comparatively thin.

2. Description of the Related Art

Conventionally, a variety of methods have been utilized for injection molding in various fields. Of these methods, a molding metal mold of a runnerless (hot runner) system has been widely used, for example, in order to reduce runner loss produced in injection molding, or to improve productivity.

There are a variety of metal molds in such a hot runner system. For example, there is a valve gate system in which it is possible to move a needle pin forward and backward relative to a gate so as to open and close the gate mechanically.

In a valve gate system, it is possible to prevent a gate portion from causing problems such as gate stringiness and to enlarge the gate diameter so that the flow of a melted resin into a metal mold is smooth. It is also possible to shorten a cycle of molding because the gate is closed mechanically. Generally, the opening and closing control of the gate in the valve gate system is carried out such that an air cylinder or a hydraulic cylinder type actuator is included in the metal mold, and such an actuator is controlled in synchronism with a molding process. This synchronization is realized generally by a process of opening a valve in response to a mold clamping signal, starting a timer at the same time, and closing a gate when the timer counts the lapse of the predetermined time.

As another example, a valve is opened in response to a mold clamping completion signal from an injection molding machine, and a gate is closed in response to a completion signal of a holding pressure. As for another system for controlling a valve gate, Japanese Patent Examined Publication Nos. Sho-63-49605 and Sho-53-4319 or Japanese Patent Unexamined Publication No. Sho-50-158654, discloses a valve gate of a system wherein the gate is opened and closed by injection pressure applied to an injection molding material (a melted resin). Each of those systems teaches a method of driving a needle pin by an energizing force of a spring, or the like, balancing with the pressure of the melted resin.

In a metal mold of a valve gate system, however, in comparison with molds in other systems, there has been a disadvantage in that scattering or deviation in shape between molded articles is large in each shot of molding. One of the reasons for the deviation is a variation of the timing when the valve is closed in a molding process.

As for the timing when the valve is closed, generally, a timer is started at a certain time point of the molding process, and the valve is closed when predetermined time counted by the a predetermined time expires a predetermined time. If in every shot (cycle) of molding a constant molding condition is assured along the design and setting of a metal mold, this system is so accurate that it should not cause deviation. However, there is a problem in that molding processes usually do not have constant molding conditions and the deviation may be caused. Accordingly, particularly in a molded product in which a high molding accuracy is required, there has been a very low yield.

On the other hand, in any of the systems disclosed in the above mentioned patent publications, a valve gate of a system is utilized in which opening and closing is carried out by injection pressure applied to an injection molding material (a melted resin), and a needle pin is driven by an energizing force such as a spring force, or the like, balancing with the melted resin pressure in the metal mold. However, since a spring for applying such a spring force is installed in a nozzle unit, it is practically impossible to control the increase or decrease of the spring force. Accordingly, the valve gate in which the spring having the same spring force is closed by the needle pin which is driven by the same resin pressure. Therefore, a metal mold and its peripheral equipment have different conditions between their initial states and the states when they have been used to some extent. It is the existing state of the art that, particularly in the case of molding for performing minute shape adjustment of a molded product (for example, adjustment of shapes such as warped shapes, caused by resin pressure) by adjusting the melted resin pressure as in plastic shutters for magnetic disk cartridges or the like, or in the case of thin molded products which are easily influenced by the resin pressure, it is barely difficult to realize the minute adjustment.

Furthermore, in such a case where a plurality of products are molded in one shot at the same time, there has been a problem according to the conventional gate close method in that it is impossible to keep an inter-balance among the respective injection molding cavities (hereinafter simply referred to as "cavities"), and particularly among cavities relating to shape adjustment, such as warping of molded products, or the like, cannot be balanced with each other. As a result, the quality of the product molded in the cavity must is irregular which causes a serious problem of a very low yield rate.

SUMMARY OF THE INVENTION

Taking the foregoing conventional problems into consideration, an object of the present invention is to provide an injection molding method using an injection molding metal mold having a valve gate for mechanically opening and closing a gate tip area facing an injection molding cavity, comprising the steps of measuring the pressure of a melted resin in said injection molding cavity in a holding pressure step in a molding process, and closing said valve gate when the measured value has reached a predetermined value.

The above object can be achieved also by a provision of an injection molding method using an injection molding metal mold having a valve gate for mechanically opening and closing a gate tip area facing an injection molding cavity, characterized in that the timing of closing said valve gate is controlled in accordance with a time from the start of a holding pressure step in a molding process.

The most preferable embodiment of the present invention is directed to an injection molding method which is characterized in that an injection molding metal mold having a valve gate for mechanically opening and closing a gate tip area facing an injection molding cavity is used, and the timing when the valve gate is closed is set with reference to a melted resin pressure in the injection molding cavity during a holding pressure step in a molding process.

The foregoing object of the present invention can be attained by the above injection molding method, wherein by use of a multi-cavity injection molding metal mold for molding a plurality of molded articles at the same time, injection to respective injection cavities is started at the same time, and the timings when respective valve gates for the respective injection cavities are closed are controlled independently of each other. Further, in the present injection molding method, during the timings when the closings of the valve gates are controlled independently of each other in a molding process, the melted resin pressures in the respective injection cavities are detected independently to produce detection signals so that the valve gates are closed independently in accordance with the detection signals, respectively. Moreover, according to the present injection molding method, the control of closing of the valves in the respective valve gates is performed by means of timers associated with the respective valve gates. Also, the timing when each of the valve gates is closed is set to fall within a range between the time of 0.2 seconds after the start of a holding pressure and the time of gate seal, and in case of a molding of a plastic shutter the melted resin pressure at the time of a holding pressure step is set to fall within a range of from 5% to 20% of the maximum injection pressure of a melted resin of the molding machine. The resin which is used as the injection molding material may be preferably selected from at least one kind of polyoxymethylene, polybutylene terephthalate and polypropylene.

The present invention further provides an injection molding apparatus which is characterized by comprising an injection molding metal mold having a valve gate for mechanically opening and closing a gate tip area facing an injection molding cavity, a melted resin filling means for injection-filling the injection molding cavity with a heated and melted resin, a pressure detecting means for detecting the pressure of the melted resin filled in the injection molding cavity, and a valve control means for closing the valve gate in response to a pressure detection signal from the detecting means.

The present invention further provides an injection molding apparatus which is characterized by comprising an injection molding metal mold having a plurality of injection molding cavities and valve gates for mechanically opening and closing gate tip areas respectively facing the injection molding cavities, a resin filling means for injection-filling the injection molding cavities with a heated and melted resin with a predetermined pressure, a timer for counting time from the start of a holding pressure by means of the resin filling means, and a gate control means for controlling the respective timings of closing the valve gates respectively provided in aid plurality of injection molding cavities in accordance with the time counted by the counter.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENT

The present invention will be described below with reference to the drawings.

The injection molding process in the case of a general injection molding apparatus using a valve gate comprises, in order, (1) a mold clamping step, (2) a gate opening step, (3) a step of filling an injection molding cavity with a melted resin, (4) a holding pressure step, (5) a gate closing step, (6) a step of cooling the melted resin in the injection molding cavity (since the cooling of the melted resin in the injection molding cavity is started from the injection filling step (3) in an actual case, the cooling step in this step (6) means the cooling step after the gate closing step (5)), (7) a mold opening step, and (8) a step of taking out a molded product of resin from the injection molding cavity. The steps (1) to (8) constitute one shot (one cycle), and a required number of injection molded products can be obtained by repeating this one shot again and again.

FIGS. 1 to 5 are diagrams illustrating an embodiment of the present invention. This embodiment will be described in reference to the injection molding of, by way of example, a plastic shutter (hereinafter simply referred to as "shutter") which is a part of a floppy disk.

Figure 1:
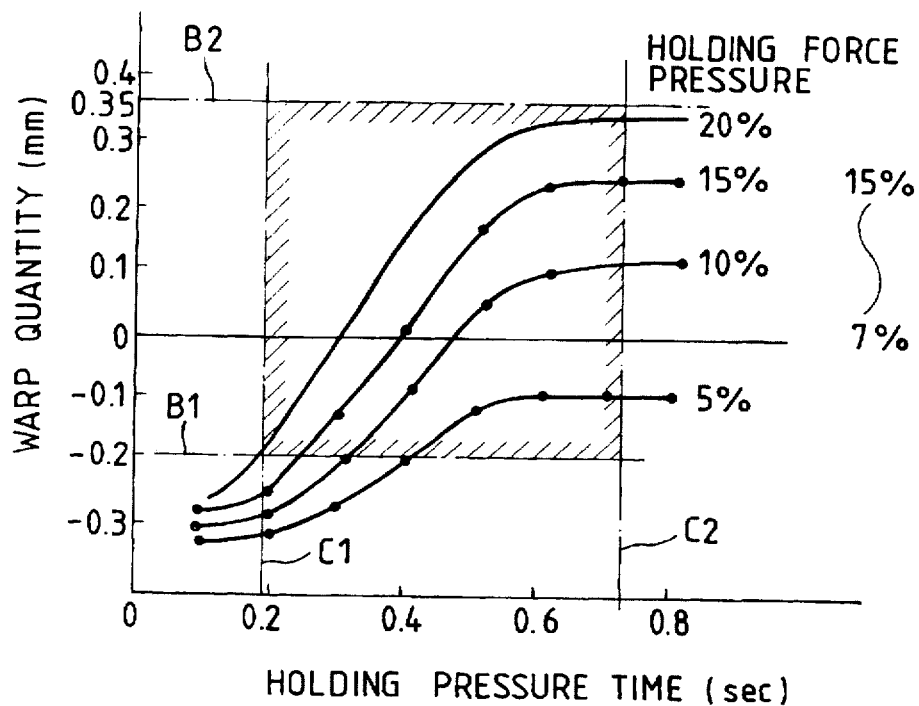
FIG. 1 is a graph showing the relationship among a holding pressure force, a holding pressure time, and a warping of molded products in an embodiment of the present invention.
Figure 2:
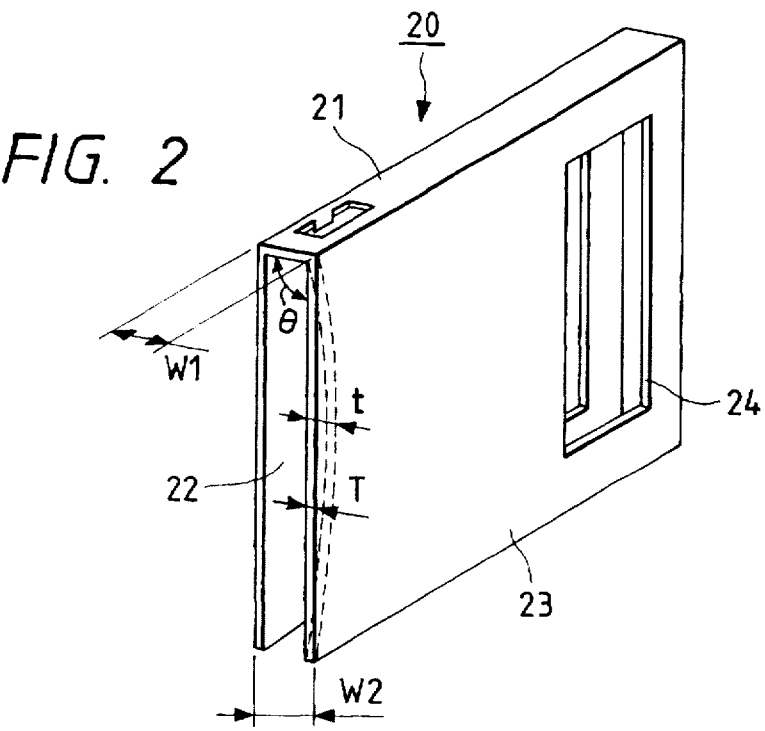
FIG. 2 is a perspective view of a shutter to which the present invention is applied.
Figure 3:
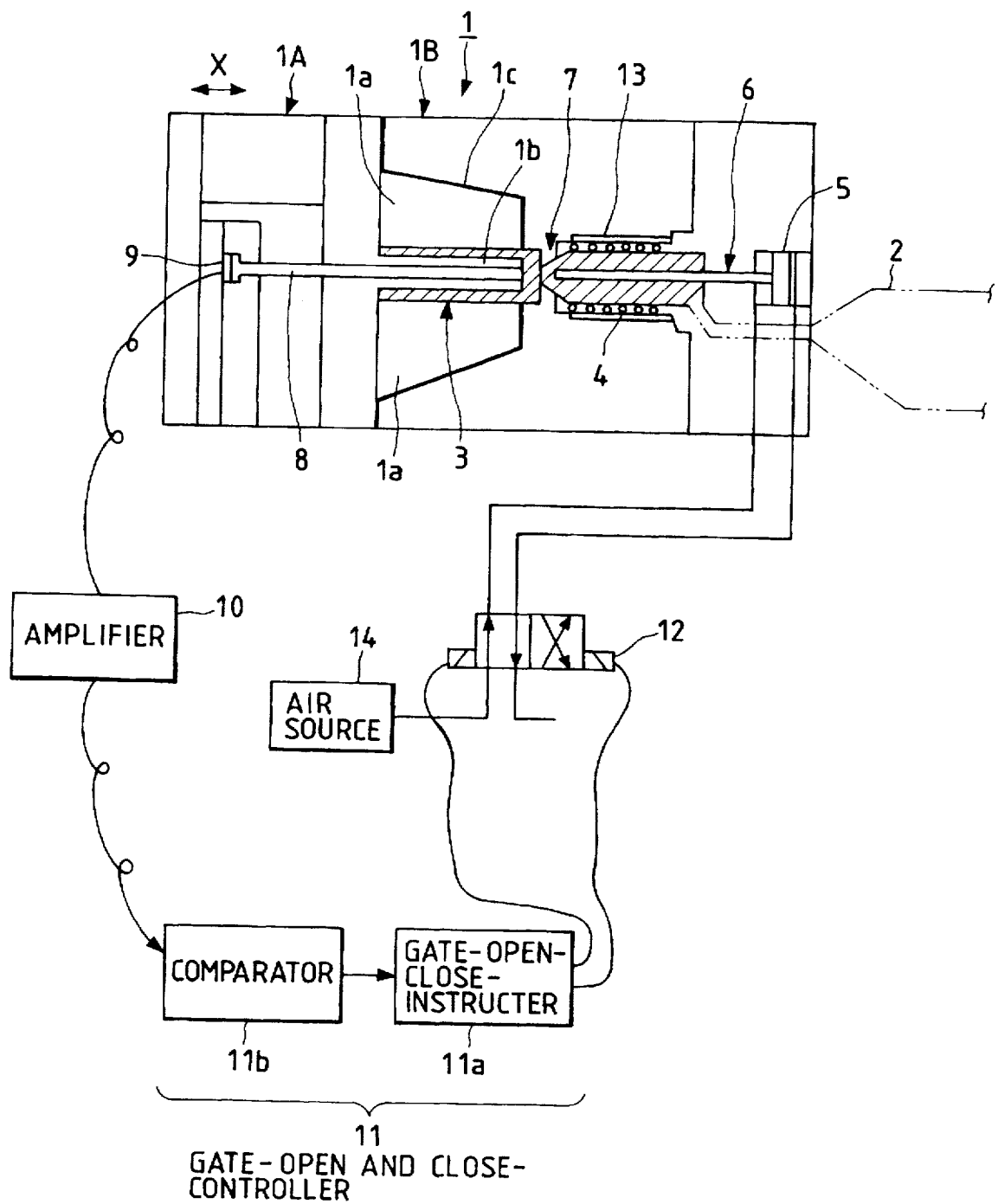
FIG. 3 is a schematic view of a molding apparatus of an embodiment of the present invention.

FIG. 1 is a graph showing the relationship among a holding pressure force, a holding pressure time and a warping of a shutter as a molded product under a holding pressure step in the injection molding processes, and FIG. 2 is a perspective view for explaining a warp of the molded shutter. FIG. 3 is a schematic view showing a molding apparatus in this embodiment.

First, the apparatus shown in FIG. 3 will be described.

In a metal mold 1, a cavity 3 is defined by a fixed mold 1B, a movable mold 1A, a center core 1b, and a pair of slide cores 1a disposed on opposite sides of the core 1b. The metal mold 1 is designed so that the fixed mold 1B and the movable mold 1A separate from each other at a parting line 1c (fat solid line) when the movable mold 1A is moved (to the left in the direction along the arrow X). At this time, the slide cores 1a open up and down, respectively, and an ejection pin 8 projects into the center core 1b so as suitably to eject a molded shutter 20 (refer to FIG. 2) from the metal mold.

FIG. 3 shows the state that the metal mold which is clamped. That is, the state that resin which is heated and melted in the injection cylinder 2 is injected into the cavity 3 through the nozzle unit 13 of the valve gate so that the cavity 3 is filled with the resin. At this time, the whole of the nozzle unit 13 is heated by the heater 4 so that the resin is not solidified in the nozzle unit 13. An example of the process to reach such a state as shown in FIG. 3 is as follows.

First, the movable mold 1A is moved right in the direction of arrow X so that the mold is clamped. After completion of this mold clamping, the needle pin 6 of the nozzle unit 13 is retarded to open the gate 7, and immediately the injection cylinder 2 is advanced so as to inject the melted resin into the cavity 3 to fill the cavity with the resin.

After the cavity 3 is filled with the melted resin, the holding pressure step is carried out so that the filling pressure of the injection cylinder 2 is held at a predetermined value for a predetermined time. In this holding pressure step, the pressure of the melted resin in the cavity is measured. It is most preferable to carry out the pressure measurement by means of a pressure detector 9 provided on the ejection pin 8 at its one end opposite to the other cavity side end as shown in FIG. 3 because the correct value of the pressure of the melted resin in the cavity can be indicated. Alternatively, however, the measurement may be carried out in such a manner that the pressure of the melted resin is measured at a desired place in a hot runner from the vicinity of the nozzle unit 13 or from the injection cylinder 2 to the nozzle unit 13 and the thus measured value is regarded as the pressure value of the melted resin in the cavity. The phrase "pressure of a melted resin in the injection molding cavity" according to the present invention includes the pressure indicated by the latter measurement.

When the thus detected pressure value has reached a predetermined value, the needle pin 6 of the nozzle unit 13 is advanced to close the gate. More specifically, the pressure of the melted resin in the cavity is detected as an electric signal generated by means of a load cell as the pressure detector 9 and this electric signal is supplied to a comparator 11b provided in the controller 11 after the electric signal is amplified by the amplifier 10. The comparator 11b compares the supplied electric signal with a reference electric signal corresponding to a predetermined pressure value and when the values of the two electric signals become equal to each other, the comparator 11b supplies a control signal to the instructor 11a so that the instructor 11a actuates the electromagnetic valve 12 in response to this control signal to switch the air supply from the air source 14 and the air exhaust to thereby actuate the air cylinder 5 to make the needle pin 6 advance to close the gate 7. The gate 7 is closed before solidification of the melted resin at this gate 7.

After the gate 7 has been closed, the ejection pin 8 is made to project, after the above mentioned cooling step (6) and the mold opening step (7), so that the molded product is taken out of the mold.

With such a series of operations, a shutter 20 as shown in FIG. 2 is formed. The shutter 20 has an approximately U-sectional shape constituted by a top surface portion 21, and front and back surface portions 22 and 23 projecting in the same direction approximately perpendicular to the top surface portion 21, and further has a window portion 24. The sectional thickness T of the shutter 20 is about 0.35 mm, and the width W1 of the top surface portion 21 is 3.60 mm. The distance W2 between the front and back surface portions 22 and 23 is intended to be equal to the width W1 of the top surface portion 21 (i.e., the difference between W1 and W2 should be 0 mm), and the warp size t is within a range of from plus 0.35 mm to minus 0.20 mm, and preferably within a range of from plus 0.20 mm to minus 0.10 mm.

Although the setting of the distance W2 depends on an angle θ between the top surface portion 21 and the front and back surface portions 22 and 23, the angle θ can be also adjusted by controlling a condition at the holding pressure step in the injection molding process.

The method of specifically setting the pressure value of the melted resin in the cavity at which the gate 7 be closed, by means of this apparatus, is, for example, as follows.

First, the pressure value at which the gate 7 is closed is set to a certain value, injection molding is carried out, and warping of the obtained shutter is measured. This procedure is repeated while changing the above mentioned pressure value to thereby obtain a graph of the relationship between the warping value and the pressure value. Then, the pressure value at which the gate 7 is closed is determined so that the warping quantity falls within a desired range on the basis of the graph and the thus determined pressure value is supplied to the comparator 11b as the reference signal.

As mentioned above, the pressure of the melted resin in the cavity directly reflects the state of the resin in the metal mold. Accordingly, if the pressure of the resin is detected directly in the cavity so as to control the timing when the gate 7 is to be closed as mentioned above, it is possible to obtain molded products which are uniform without any injection deviation, or the like, of the molding apparatus. Further, even if the molding apparatus is worn after repeating the shots and the accuracy of the molding is deteriorated, it can be easily adjusted and compensated by the foregoing processes.

If the method in which the pressure of the melted resin in the cavity in the period of holding pressure step is monitored to thereby control the timing of closing the gate on the basis of the monitored pressure value in such a manner as described above is employed, it is very advantageous when injection molding is carried out by using an injection molding metal mold for obtaining a plurality of molded products at the same time. For example, in the case where injection molding is carried out by using a metal mold having 8 cavities for one injection cylinder, if such a nozzle unit as mentioned above is provided in every cavity and a sensor is provided in every cavity for monitoring the pressure of the melted resin in the cavity, the pressure-values for obtaining optimum molded products from the respective cavities can be determined and controlled independently from each other and the timings for closing the respective gates provided in the corresponding cavities can be controlled on the basis of the thus determined pressure values. Accordingly, even if the 8 cavities are somewhat different in manufacturing accuracy from each other, injection molding conditions proper for the respective cavities can be set so that injection molded products which are equal to each other in quality can be obtained from all the 8 cavities. Conventionally, in such a case, it is required to perform correction working on the 8 cavities bit by bit while relying on feeling and the correction working is repeated until all the obtained injection molded products become equal in quality to each other or another metal mold is manufactured. According to the present invention, however, it is possible to eliminate such troublesome correction work on the metal mold or remanufacturing of a new metal mold, or at least it is possible to simplify such work.

In the above embodiment, the pressure of the melted resin in every cavity is monitored so that the gate closing timing is controlled on the basis of the monitored value of the pressure. Alternatively, the object of the present invention can be achieved by a method in that the gate closing timing is controlled in accordance with the time from the start of a holding pressure. The phrase "the start of a holding pressure" according to the present invention means the point of time at which the injection control of a molding machine when a melted resin is injected and filled into a cavity by means of an injection cylinder is changed over from the control based on the position and speed of a screw in the injection cylinder to the control based on the pressure of melted resin in the injection cylinder and the passage of time.

Generally, the melted resin pressure (a holding pressure force) applied by the injection cylinder in the holding pressure step is selected to be a value in a range of from about 5% to about 20% of the maximum injection pressure of the molding machine while it varies less or more depending on the shape of the molded product. The graph of FIG.

1 shows an example of the relationship between the shutter warping quantity and the holding pressure time in the above range of the holding pressure force. From FIG. 1, it is understood that if the holding pressure force is determined, the warping quantity is determined on the basis of the holding time time. The graph of FIG. 1 relates to a specific cavity and the absolute value of the relationship between the warping quantity and the holding pressure time changes if the cavity is replaced by another one, but the curve of the graph per se shows the same tendency even if the cavity changes.

The above fact means that the shutter warping quantity can be controlled based on the holding pressure time if the graph of FIG. 1 is generated for each of the cavities of a produced metal mold. Accordingly, if the gate closing timing is controlled in accordance with the passage of time from the start of the holding pressure, it is possible to obtain shutters always having a predetermined quantity of warping.

In the case where injection molding is carried out by using an injection molding metal mold for molding numbers of molded products at one time, however, the melted resin pressures in the respective cavities become different from each other inevitably even if the holding pressure force is set to be a predetermined value. This is based on the fact that the pressure in the injection cylinder suffers losses until the melted resin reaches each cavity, and the fact that the respective manufacturing sizes of the cavities cannot be made strictly the same with each other. In the case where injection molding is carried out by using an injection molding metal mold for molding numbers of several molded products at one time, accordingly, it is only possible to obtain shutters which are different in quantity of warping depending on the cavities even if all the gate closing timings of the respective cavities are set predeterminedly on the basis of the holding pressure force (that is, the pressure applied onto the melted resin by means of the injection cylinder). However, since the pressure of the melted resin in each cavity is determined always univocally if the holding pressure force is determined (while the melted resin pressures in the respective cavities are different from each other), it is possible to obtain shutters having the same quantity of warping from all the respective cavities if the passages of time from the start of the holding pressure are set independently of each other in accordance with the melted resin pressures in the respective cavities.

Figure 4:
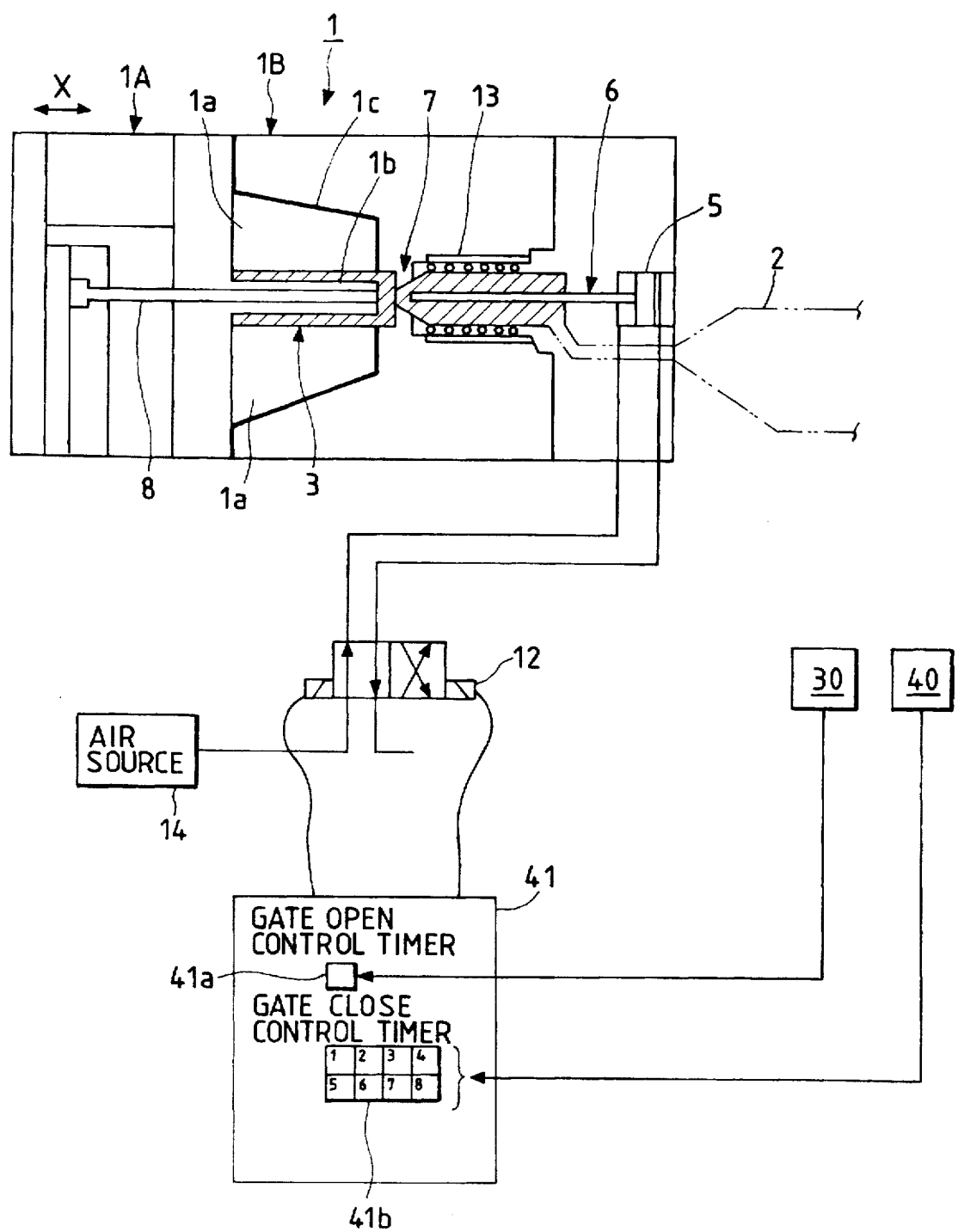
FIG. 4 is a schematic view illustrating the mold apparatus according to another embodiment of the present invention.

FIG. 4 is a schematic view showing an injection molding apparatus using an injection molding metal mold for molding numbers of several molded products at one time according to the method of controlling the valve gate closing timing in accordance with the passage of time from the start of a holding pressure as mentioned above. In FIG. 4, parts the same as those in FIG. 3 are referenced correspondingly.

The controller 41 controls the operation of the electromagnetic valves 12, and drives the respective air cylinders 5 in the metal mold 1 so as to control the open and close timing of the respective gates 7. The controller 41 is provided with a timer 41a for controlling the timing when the air cylinders 5 drive the needle pins 6 in the gate open direction, and eight timers 41b associated with the respective air cylinders for controlling the timings when the air cylinders 5 drive the needle pins 6 in the gate close direction, respectively.

The timer 41a is set to be started by a mold clamping end signal 30 of the molding apparatus. The output of the timer 41a is supplied to the eight electromagnetic valves 12 at the same time so as to open the eight gates 7 at the same time.

The eight timers 41b are set to be started by a switching signal 40 from the step (3), i.e., a step of filling an injection molding cavity with a melted resin, to a holding pressure step (step (4)), i.e., a pressure holding start signal of the molding apparatus at the same time, and to output timing signals in a holding pressure step of the molding apparatus. The outputs of the respective timers 41b are independently supplied to their associated electromagnetic valves 12 so as to close their associated gates 7.

In the injection molding according to the molding apparatus in this embodiment, taking into consideration the fact that the time of a given pressure after injection has a close connection with the warping of the molded products, the holding pressure time is independently set for every cavities. Accordingly, it is possible to independently control and adjust the timing of closing the gate 7 of each cavity, so that it is possible to obtain all molded articles, each having a desired warping of molded products peculiar to the cavity 3 constant. In the above embodiment, eight timers for controlling the close operation of the gate is used, a single timer may be replaced therewith which is employed for controlling a timing of the close operation of each of the gates.

Description will be made below about an example in which the present inventor carried out the above-mentioned multi-cavity molding method through the use of the apparatus shown in FIG. 4. Here, in order to establish the warping of the shutters 20 molded specifically, the eight cavities 3 were balanced in the following procedure. Three kinds of resins, polyoxymethylene, polybutylene terephthalate and polypropylene were used.

(1) The warping of the shutters molded as a trial is measured.

(2) The proper timings of closing the gates for the respective cavities are read on the basis of the measured warping data through the use of the graph in FIG. 1. FIG. 1 is a graph showing the relationship between the holding pressure-force, the holding pressure time and the warping of the shutters (dimension t).

(3) The read timings of closing the gates for the respective cavities 3 are set in the timers 41b, and molding for confirmation is performed.

Although the timings of closing the respective gates 7 in a molding process are controlled individually for the respective gates as mentioned above, the range of the timing of closing each gate was set within a range from the time of the completion of charging the melted resin into the cavities until the time of gate seal, in this experiment. Actually, the gate seal in molding the shutters was performed about 0.7 seconds after the completion of charging. This time became the upper limit time of the adjustment range of the holding pressure time, shown by the vertical line C2 in FIG. 1. From the judgment standard as to whether the molded shutters are suitable for practical use or not, the upper limit of warping was plus 0.35 mm, which is shown by the transverse line B2 in FIG. 1, and the lower limit of warping was minus 0.2 mm, which is shown by the transverse line B1 in FIG. 1. Further, the shortest time of a holding pressure was set to 0.2 seconds, which is shown by the vertical line C1 located at a position where a curve in 20% of the maximum melted resin injection pressure of the molding apparatus intersects with the above-mentioned transverse line B1. The range surrounded by these four lines (the inside of each line is shown by the oblique lines) was a control range.

Figure 5:
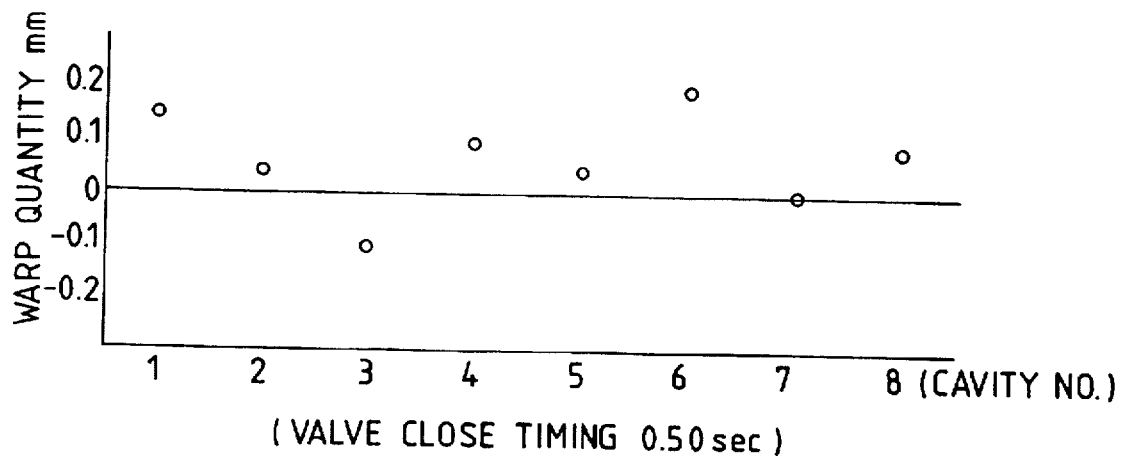
FIG. 5 is a graph illustrating the warping of the molded products in respective cavities before the adjustment of gate close timing.

FIG. 5 shows the quantity of warping when the timings of closing the respective gates 7 were set to 0.5 seconds under the conditions of the holding pressure of 13% of the maximum resin injection pressure of the molding apparatus in the eight-cavity metal mold for the shutters 20. From the drawing, the cavities other than the cavity No. 3 had a positive warping tendency, the plus side.

Figure 6:
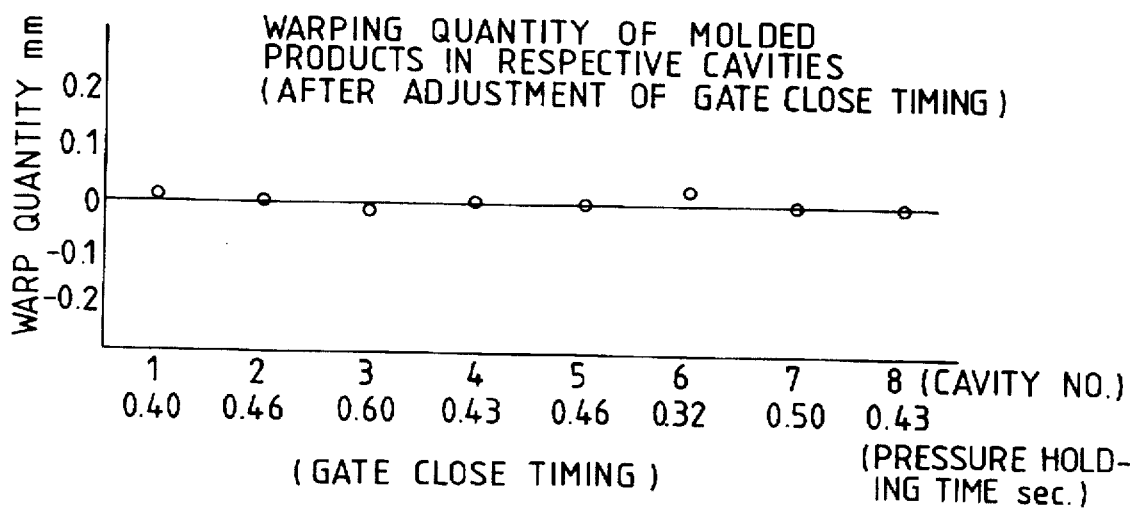
FIG. 6 is a graph illustrating the warping quantity of molded products in respective cavities after the adjustment of gate close timing.

FIG. 6 shows a result when the timings of closing the respective gates 7 were adjusted according to the method of the present invention (so as to make the warping zero). This result shows the adjustment performed within the range between the shortest time 0.32 sec and the longest time 0.60 sec. As is apparent from FIG. 6, it is possible to adjust deviation in each cavity within a desired range easily according to the method of the present invention.

Thus, in molding the above mentioned shutters 20, in both the case where the control of closing the valves of the respective gates 7 is performed by the timers associated with the respective gates 7 and the case where it was performed on the basis of signals of the pressure detectors 9, the range of the timings when the respective gates 7 are closed is between the time when 0.2 sec had passed since a holding pressure is started, and the time of gate seal (which means the state where the melted resin around the gate portions has been cooled and solidified so that resin cannot go out or come into the gate portions substantially even when the gate is in an opened state, and which was about 0.7 sec). When the maximum injection pressure of the molding apparatus is about 3,000 kgf/cm$^2$, stable molding can be performed when the melted resin pressure at the time of a holding pressure was set to a value within a range of from 5% to 20% (about 150 kgf/cm$^2$ to 600 kgf/cm$^2$) of the resin pressure at the time of injection.

To control the holding pressure force, there are two control methods, one in which the holding pressure force forms a smooth curve with the range of time, and the other in which holding pressure force is changed step by step as time elapses. The size of the holding pressure force, here, is a final one when the gate 7 is to be closed. In the relationship between the holding pressure time and the warping quantity, the rate of change of the warping to the pressure holding time becomes larger as a shutter becomes thinner, and the rate of change of the warping to the pressure holing time becomes larger as the holding pressure force becomes larger.

The resin used herein was a single or a proper mixture of polyoxymethylene, polybutylene terephthalate and polypropylene. Preferably, the range of melt flow index (MI) [ASTMD1238 (ISO1133) Standards] of these resins is 40 to 65.

The shutter 20 shown in FIG. 2 and extracted from the above-mentioned injection molding cavity according to the present injection molding method had a product approximately U-shaped in section and constituted by a top surface portion, and front and back surface portions projecting in the same direction approximately perpendicular to the top surface portion. The distance between the tips of the front and back surface portions in the product shape was controlled to fall within a range of from plus 0.35 mm to minus 0.20 mm relative to the width of the top surface portion.

The cavity 3 was shaped correspondingly to the shutter shown in FIG. 2, and was made to have thickness T (0.3 mm to 0.4 mm). When the length L between the gate 7 and a final charging position in the cavity was changed to 68 mm at the maximum, substantially the same result as mentioned above could be obtained at the value L/T in a range of not more than 170.

In the molding apparatus shown in FIG. 3, an air cylinder, a hydraulic cylinder, a cam mechanism or any other mechanical means may be used as a needle pin driving means.

Although a projecting pin is used as a portion of a resin pressure detecting member in the above embodiment, the present invention is not limited to this, but any other pressure detecting means may be suitably provided.

As has been described above, in the present invention, the timing of closing the above described valve gate is set with reference to the resin pressure in a cavity or lapse of time in a holding pressure step in a molding process. According to the present invention, therefore, it is possible to adjust this holding pressure force or the time thereof easily, so that it is possible to perform stable molding even in such molding where the warping of molded products is delicately adjusted. Particularly, even if the resin pressure in the cavity varies the deviation in each shot because of various reasons, the resin pressure is measured to decide the timing of closing the gate, so that it is possible to make constant the warping of molded products peculiar to the cavity. In a multi-cavity metal mold for molding a plurality of molded products, even if the influence of the manufacturing accuracy of the metal mold, or the like, prevents injection from being performed upon all the respective cavities under uniform conditions, it is possible to balance the warping of the molded products.

It is contemplated that numerous modifications may be made to the injection molding method and apparatus of the present invention without departing from the spirit and scope of the invention as defined in the following claims.

What is claimed is:

1. An injection molding method using an injection molding metal mold having a valve for mechanically opening and closing an injection gate facing an injection molding cavity, comprising the steps of:

opening said valve to fill the cavity with melted resin;

after the cavity is filled with the melted resin, holding a filling pressure at a predetermined value for a predetermined time;

measuring the pressure of the melted resin in said injection molding cavity during said predetermined time using a pressure detector in said injection molding cavity; and closing said valve when the pressure of the melted resin reaches a predetermined value.

2. An injection molding method according to claim 1, wherein said injection molding metal mold has a plurality of said injection molding cavities each having a valve, and at least said holding, measuring and closing steps are conducted for each of said valves independently of each other.

3. An injection molding method using an injection molding metal mold having a valve for mechanically opening and closing an injection gate facing an injection molding cavity, comprising the steps of:

opening said valve to fill the cavity with melted resin;

after the cavity is filled with the melted resin, holding a filling pressure at a predetermined value;

measuring an elapsed time from the start of said holding step; and closing said valve when the elapsed time reaches a predetermined value.

4. An injection molding method according to claim 3, wherein said injection molding metal mold has a plurality of said injection molding cavities each having a valve, and at least said holding, measuring and closing steps are conducted for each of said cavities independently of each other.

5. An injection molding method according to claim 3, wherein the timing of said closing step is set to fall within a range from 0.2 seconds after a start of said holding pressure step to a time of gate seal.

6. An injection molding apparatus comprising:

an injection molding metal mold having a valve for mechanically opening and closing an injection gate facing an injection molding cavity;

resin filling means for injection filling said injection molding cavity with a heated and melted resin;

pressure detecting means for detecting a pressure of the melted resin filled in said injection molding cavity; and valve gate control means for closing said valve in response to a pressure detection signal from said pressure detecting means.

7. An injection molding apparatus comprising:

an injection molding metal mold having a plurality of injection molding cavities and valves for mechanically opening and closing injection gates respectively facing said injection molding cavities;

a resin filling means for injection filling said injection molding cavities with a heated and melted resin with a predetermined pressure;

a timer for counting elapsed time from the start of a holding step in which a filling pressure of the melted resin is held at a predetermined value; and a gate control means for controlling the respective timings of closing said valves respectively facing said plurality of injection molding cavities in accordance with the elapsed time counted by said timer.

8. An injection molding method according to claim 1, further comprising the steps of, in order, (1) a mold clamping step, (2) the opening step, (3) a step of filling the injection molding cavity with the melted resin, (4) the holding step, (5) the closing step, (6) a step of cooling the melted resin in the cavity, (7) a mold-opening step and (8) a step of removing a molded product of the resin from the cavity.

* * * * *

REEXAMINATION CERTIFICATE (3855th)

United States Patent [19]
Watanabe

[11] B1 5,766,526
[45] Certificate Issued Aug. 24, 1999

[54] METHOD AND APPARATUS FOR INJECTION MOLDING

[75] Inventor: Seiichi Watanabe, Kanagawa, Japan

[73] Assignee: Fuji Photo Film Co., Ltd., Minami ashigara, Japan

Reexamination Request:
No. 90/005,104, Sep. 25, 1998

Reexamination Certificate for:
Patent No.: 5,766,526
Issued: Jun. 16, 1998
Appl. No.: 08/420,816
Filed: Apr. 12, 1995

[30] Foreign Application Priority Data

Apr. 20, 1994 [JP] Japan .................................... 6-104398

[51] Int. Cl.[6] .................................................. B29C 45/77
[52] U.S. Cl. ................. 264/40.5; 264/328.8; 264/328.1; 425/145; 425/146; 425/149
[58] Field of Search ............................... 264/40.5, 328.8, 264/DIG. 69, 328.1; 425/144, 145, 146, 147, 149, 156, 165, 166

[56] References Cited

FOREIGN PATENT DOCUMENTS 0310905  4/1989  European Pat. Off. .

*Primary Examiner*—Harold Y. Pyon

[57] ABSTRACT

An injection molding method and apparatus in which an injection molding metal mold having a valve gate 7 mechanically opening and closing a gate facing an injection molding cavity is used, and the timing of closing the valve gate is set with reference to a melted resin pressure in the injection molding cavity during a holding pressure step in a molding process. The molding method and apparatus result in high accuracy molded products by utilizing a valve gate system in the injection molding of thin products, and also result in molded products having less variations among cavities even in the case where a plurality of products are molded at the same time.

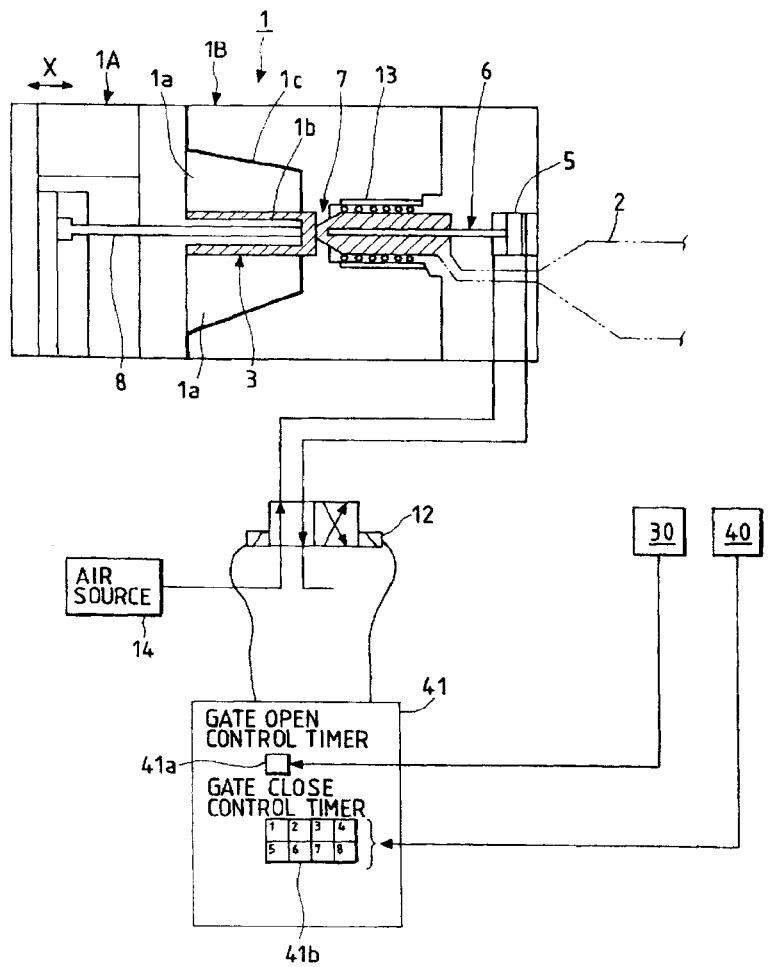

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 and 7–8 is confirmed.

Claim 6 is determined to be patentable as amended.

6. An injection molding apparatus comprising:

an injection molding metal mold having a valve for mechanically opening and closing an injection gate facing an injection molding cavity;

resin filling means for injection filling said injection molding cavity with a heated and melted resin;

*means for holding a filling pressure of said resin in said injection molding cavity at a predetermined value for a predetermined time;* pressure detecting means for detecting a pressure of the melted resin filled in said injection molding cavity *during said predetermined time*; and valve gate control means for closing said valve in response to a pressure detection signal from said pressure detecting means.

* * * * *